(12) United States Patent
Bao et al.

(10) Patent No.: US 12,489,508 B2
(45) Date of Patent: Dec. 2, 2025

(54) TRANSMISSION TYPE SELECTION FOR BEAM SWITCHING

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 423 days.

(21) Appl. No.: 18/000,912

(22) PCT Filed: Jul. 13, 2021

(86) PCT No.: PCT/US2021/041440
§ 371 (c)(1),
(2) Date: Dec. 6, 2022

(87) PCT Pub. No.: WO2022/026174
PCT Pub. Date: Feb. 3, 2022

(65) Prior Publication Data
US 2023/0224014 A1 Jul. 13, 2023

(30) Foreign Application Priority Data
Jul. 28, 2020 (GR) .............................. 20200100447

(51) Int. Cl.
*H04B 7/06* (2006.01)
*H04B 7/0404* (2017.01)
*H04B 7/0408* (2017.01)

(52) U.S. Cl.
CPC ....... *H04B 7/06952* (2023.05); *H04B 7/0404* (2013.01); *H04B 7/0408* (2013.01)

(58) Field of Classification Search
CPC .. H04B 7/0695; H04B 7/0404; H04B 7/0408; H04B 7/088; G01S 5/0236; G01S 5/01; H04W 64/00
(Continued)

(56) References Cited

U.S. PATENT DOCUMENTS 10,512,075 B2  12/2019  John Wilson et al.
10,972,987 B2   4/2021  Akkarakaran et al.
(Continued)

FOREIGN PATENT DOCUMENTS

WO  2018144168      8/2018
WO  2018175242 A1   9/2018
(Continued)

OTHER PUBLICATIONS

International Search Report and Written Opinion—PCT/US2021/041440—ISA/EPO—Jan. 14, 2022.
(Continued)

*Primary Examiner* — Don N Vo
(74) *Attorney, Agent, or Firm* — QUALCOMM Incorporated

(57) ABSTRACT

Various aspects of the present disclosure generally relate to wireless communication. In some aspects, a user equipment may select one or more transmission types for communication on a plurality of beams during a time period based at least in part on transmission type priorities, and communicate on the plurality of beams during the time period based at least in part on selecting the one or more transmission types for communication. In some other aspects, a base station may receive an indication of one or more transmission types that a user equipment selected for communication on a plurality of beams during a time period and receive the one or more transmission types the UE selected for communication on the plurality of beams. In some further
(Continued)

aspects, a network node for wireless communications may determine configuration information for a positioning reference signal, PRS, operation by a user equipment and transmit the configuration information to a base station that schedules communications for the UE. Numerous other aspects are provided.

30 Claims, 9 Drawing Sheets

(58) Field of Classification Search
USPC .......................................................... 455/101
See application file for complete search history.

(56) References Cited

U.S. PATENT DOCUMENTS

| | | | |
|---|---|---|---|
| 2019/0364449 A1* | 11/2019 | Yang | ..................... H04W 72/04 |
| 2019/0394634 A1 | 12/2019 | Akkarakaran et al. | |
| 2020/0067615 A1 | 2/2020 | Ghanbarinejad et al. | |
| 2020/0154240 A1 | 5/2020 | Edge et al. | |
| 2022/0377810 A1* | 11/2022 | Bhamri | .............. H04B 7/06966 |
| 2023/0080162 A1* | 3/2023 | Ghanbarinejad | ..... H04W 52/46 455/522 |
| 2023/0387983 A1* | 11/2023 | Hou | ......................... H04B 1/40 |

FOREIGN PATENT DOCUMENTS

| | | |
|---|---|---|
| WO | 2019067399 | 4/2019 |
| WO | WO-2019096195 A1 | 5/2019 |
| WO | WO-2020068310 A1 | 4/2020 |

OTHER PUBLICATIONS

Partial International Search Report—PCT/US2021/041440—ISA/EPO—Oct. 26, 2021.

* cited by examiner

TRANSMISSION TYPE SELECTION FOR BEAM SWITCHING

CROSS-REFERENCE TO RELATED APPLICATIONS

This Patent Application is a 371 national stage of PCT Application No. PCT/US2021/041440filed on Jul. 13, 2021, entitled "TRANSMISSION TYPE SELECTION FOR BEAM SWITCHING," which claims priority to Greek patent application Ser. No. 20/200,100447, filed on Jul. 28, 2020, and entitled "TRANSMISSION TYPE SELECTION FORBEAM SWITCHING," and assigned to the assignee hereof. The disclosure of the prior Applications are considered part of and incorporated by reference into this Patent Application.

FIELD OF THE DISCLOSURE

Aspects of the present disclosure generally relate to wireless communication and to techniques and apparatuses for selecting transmission types for beam switching.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a user equipment (UE) includes selecting one or more transmission types for communication on a plurality of beams during a time period based at least in part on transmission type priorities, and communicating on the plurality of beams during the time period based at least in part on selecting the one or more transmission types for communication.

In some aspects, a method of wireless communication performed by a base station includes receiving an indication of one or more transmission types that a UE selected for communication on a plurality of beams during a time period and receiving the one or more transmission types the UE selected for communication on the plurality of beams.

In some aspects, a method of wireless communication performed by a network node includes determining configuration information for a positioning reference signal operation by a UE and transmitting the configuration information to a base station that schedules communications for the UE.

In some aspects, a UE for wireless communication includes a memory and one or more processors coupled to the memory, the one or more processors configured to select one or more transmission types for communication on a plurality of beams during a time period based at least in part on transmission type priorities, and communicate on the plurality of beams during the time period based at least in part on selecting the one or more transmission types for communication.

In some aspects, a base station for wireless communication includes a memory and one or more processors coupled to the memory, the one or more processors configured to receive an indication of one or more transmission types that a UE selected for communication on a plurality of beams during a time period, and receive the one or more transmission types the UE selected for communication on the plurality of beams.

In some aspects, a network node for wireless communication includes a memory and one or more processors coupled to the memory, the one or more processors configured to determine configuration information for a positioning reference signal operation by a UE, and transmit the configuration information to a base station that schedules communications for the UE.

In some aspects, a non-transitory computer-readable medium storing a set of instructions for wireless communication includes one or more instructions that, when executed by one or more processors of a UE, cause the UE to select one or more transmission types for communication on a plurality of beams during a time period based at least in part on transmission type priorities, and communicate on the plurality of beams during the time period based at least in part on selecting the one or more transmission types for communication.

In some aspects, a non-transitory computer-readable medium storing a set of instructions for wireless communication includes one or more instructions that, when executed by one or more processors of a base station, cause the base station to receive an indication of one or more transmission types that a UE selected for communication on a plurality of beams during a time period, and receive the one or more transmission types the UE selected for communication on the plurality of beams.

In some aspects, a non-transitory computer-readable medium storing a set of instructions for wireless communication includes one or more instructions that, when executed by one or more processors of a network node, cause the network node to determine configuration information for a positioning reference signal operation by a UE, and transmit the configuration information to a base station that schedules communications for the UE.

In some aspects, an apparatus for wireless communication includes means for selecting one or more transmission types for communication on a plurality of beams during a time period based at least in part on transmission type priorities, and means for communicating on the plurality of beams during the time period based at least in part on selecting the one or more transmission types for communication.

In some aspects, an apparatus for wireless communication includes means for receiving an indication of one or more transmission types that a UE selected for communication on a plurality of beams during a time period, and means for receiving the one or more transmission types the UE selected for communication on the plurality of beams.

In some aspects, an apparatus for wireless communication includes means for determining configuration information for a positioning reference signal operation by a UE and means for transmitting the configuration information to a base station that schedules communications for the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
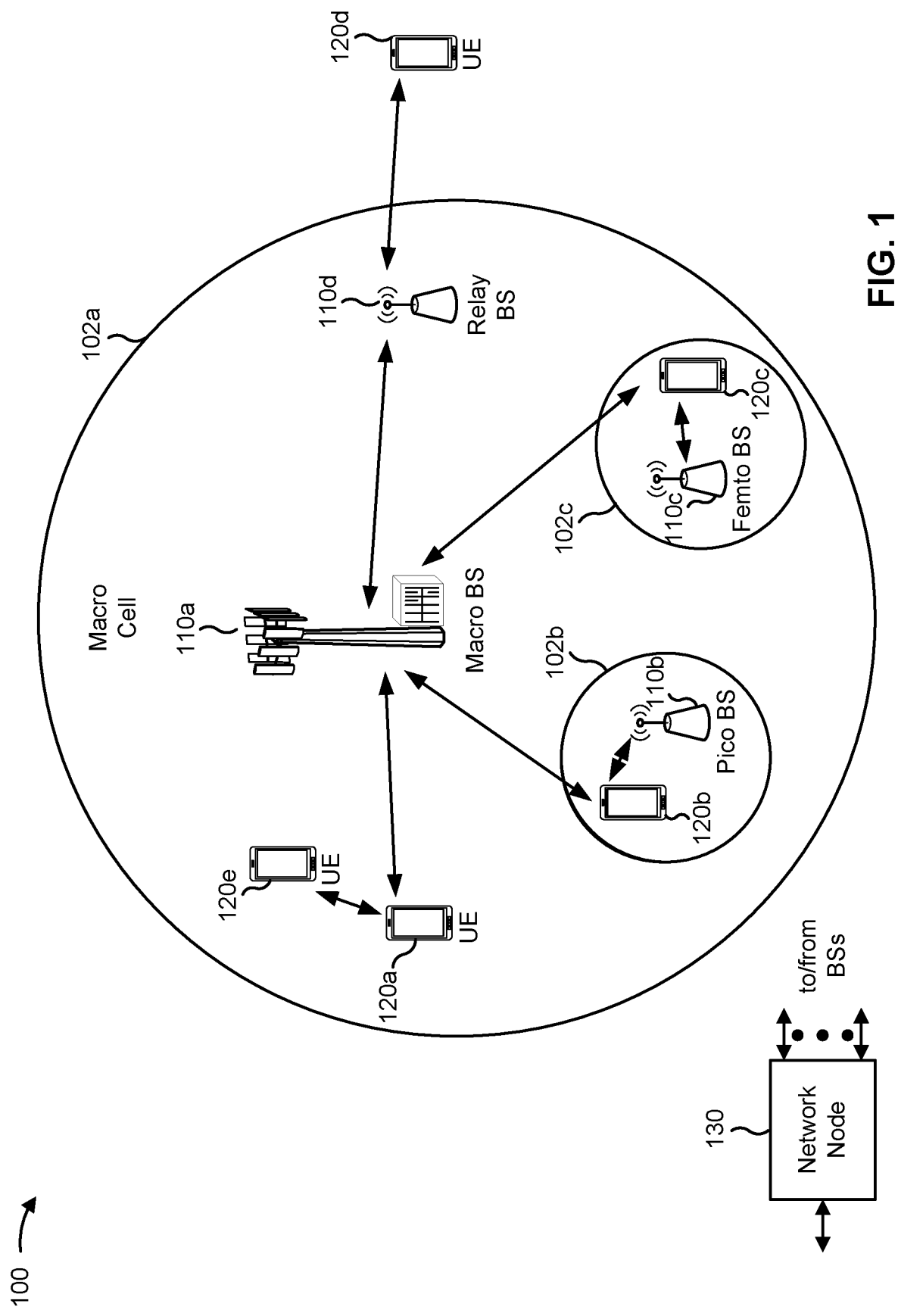
FIG. 1 is a diagram illustrating an example of a wireless network, in accordance with the present disclosure.

A user equipment (UE) may start with a beam for reception of a physical downlink control channel (PDCCH) and then switch to a beam for reception of a physical downlink shared channel (PDSCH). The PDSCH may have a high priority in this case, and thus the UE may use another beam to receive on the PDSCH. The UE may also need to measure a positioning reference signal (PRS) in order to provide location estimates to a location management function (LMF) in a core of the network. However, the UE may be limited as to how many beams the UE may switch or use during a slot, and the LMF may not be able to accurately determine the location of the UE. In some scenarios, data may be of high priority, and such data may need to be transmitted or received. However, if some beam switching opportunities are consumed by a PRS operation, the UE may be constrained as to the beams that can be used for a necessary data transfer, and the high priority data may have to wait.

According to various aspects described herein, the UE may select one or more transmission types for beam switching in a slot. The UE may select certain transmission types and ignore other transmission types based at least in part on transmission type priorities. Transmission types may include PDCCH, PDSCH, physical uplink control channel (PUCCH), physical uplink shared channel (PUSCH), PRS, channel state information reference signals (CSI-RSs), and/or sounding reference signals (SRSs). By prioritizing traffic when a UE capability of the UE limits a quantity of beams for beam switching in a slot, the network may obtain accurate location results and/or transfer high priority data.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with UEs and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller may couple to a set of BSs and may provide coordination and control for these BSs. The network controller may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
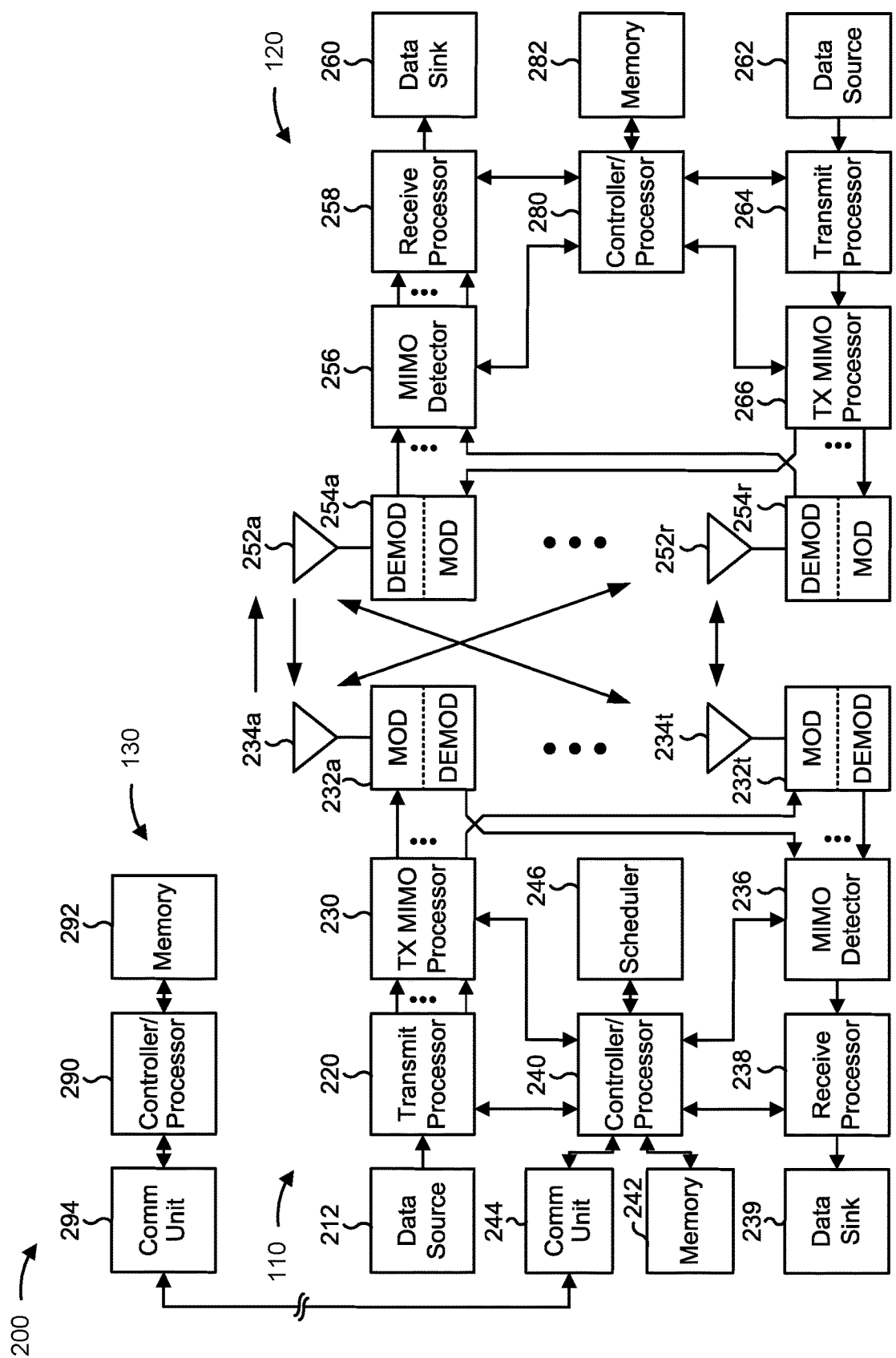
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

A network node 130 may include communication unit 294, controller/processor 290, and memory 292. Network node 130 may include, for example, one or more devices in a core network. Network node 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network node 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-9).

Controller/processor 240 of base station 110, controller/processor 280 of UE 120, and/or any other component(s) of FIG. 2 may perform one or more techniques associated with selecting transmission types for beam switching, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, process 700 of FIG. 7, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, UE 120 may include means for selecting one or more transmission types for communication on a plurality of beams during a time period based at least in part on transmission type priorities, and/or means for communicating on the plurality of beams during the time period based at least in part on selecting the one or more transmission types for communication. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, base station 110 may include means for receiving an indication of one or more transmission types that a UE selected for communication on a plurality of beams during a time period, and/or means for receiving the transmission types the UE selected for communication on the plurality of beams. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

In some aspects, network node 130 may include means for determining configuration information for a PRS operation by a UE, and/or means for transmitting the configuration information to a base station that schedules communications for the UE. In some aspects, such means may include one or more components of network node 130 described in connection with FIG. 2, such as controller/processor 290, memory 292, and/or communication unit 294.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
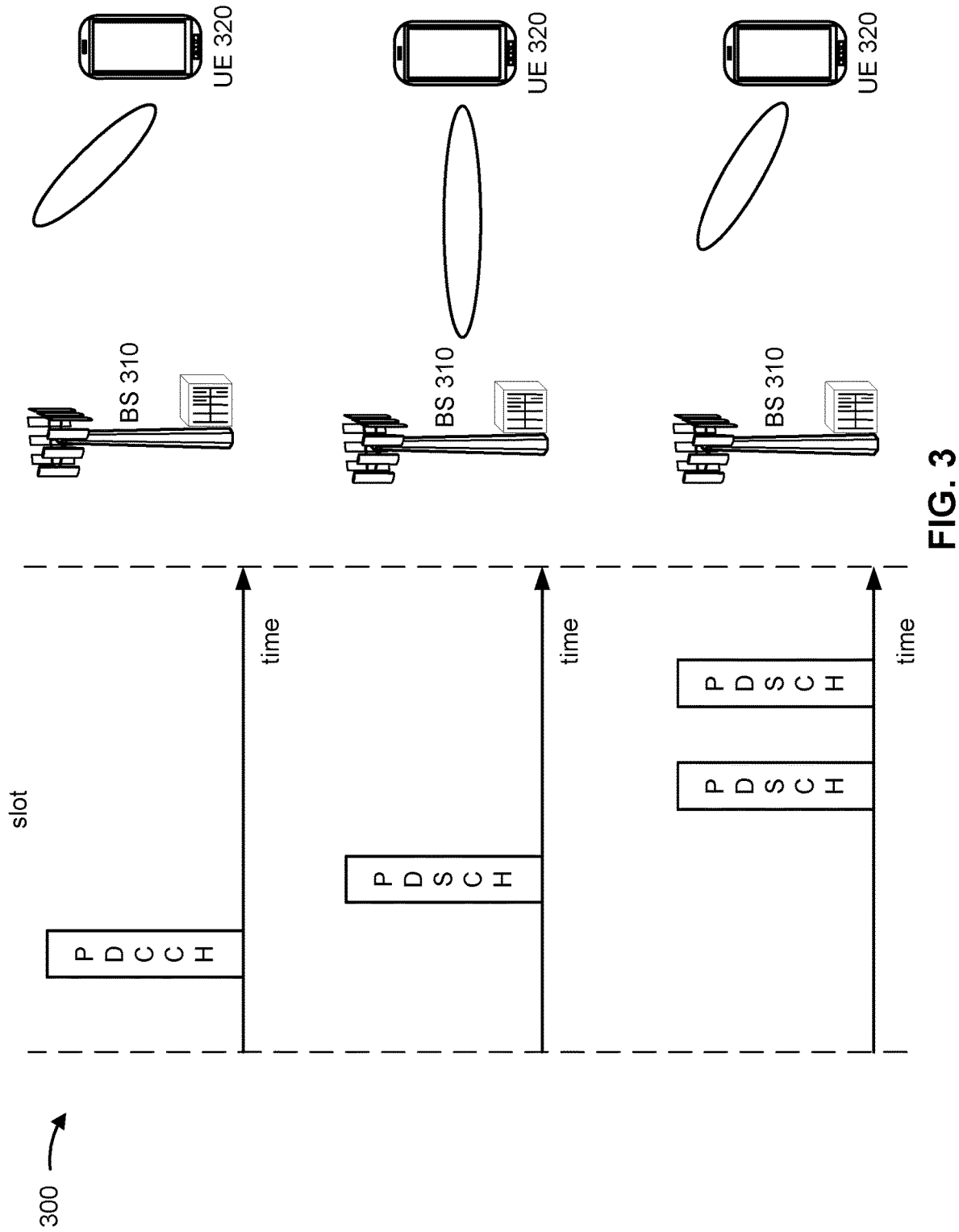
FIG. 3 is a diagram illustrating an example of beam switching, in accordance with the present disclosure.

FIG. 3 is a diagram illustrating an example 300 of beam switching, in accordance with the present disclosure. As shown in FIG. 3, example 300 includes a UE 320 (e.g., UE 120) in communication with a base station 310 (e.g., base station 110) in a wireless network (e.g., wireless network 100). In some aspects, UE 320 and base station 310 may be in a connected state (e.g., a radio resource control (RRC) connected state).

Example 300 shows a timing of beams within a time period, such as a slot. UE 320 may start with a beam for reception of a PDCCH and then switch to a beam for reception of a PDSCH. The PDSCH may have a high priority in this case and thus UE 320 may use another beam to receive on the PDSCH. UE 320 may also need to measure a PRS in order to provide location estimates to an LMF in a core of the network. However, UE 320 may be limited as to how many beams UE 320 may switch or use during the slot. The PRS operation may require three beam switching times and UE 320 may have run out of beams for the slot.

Thus, the PRS operation is not able to be transmitted and the LMF may not be able to accurately determine the location of UE 320. As a result, the network may have inaccurate location information that will affect scheduling for UE 320. This may lead to degraded or lost communications, and UE 320 and the network may waste power, processing resources, and signaling resources establishing a UE location, retransmitting communications, and/or performing new beam management procedures.

In some aspects, data may be of high priority and such data may need to be transmitted or received. However, if some beam switching opportunities are consumed by a PRS operation, the UE may be constrained as to the beams that can be used for a necessary data transfer. The data may have to wait, and UE 320 may waste power, time, processing resources, and signaling resources determining how to transmit the data in a later slot.

As indicated above, FIG. 3 is provided as an example. Other examples may differ from what is described with respect to FIG. 3.

Figure 4:
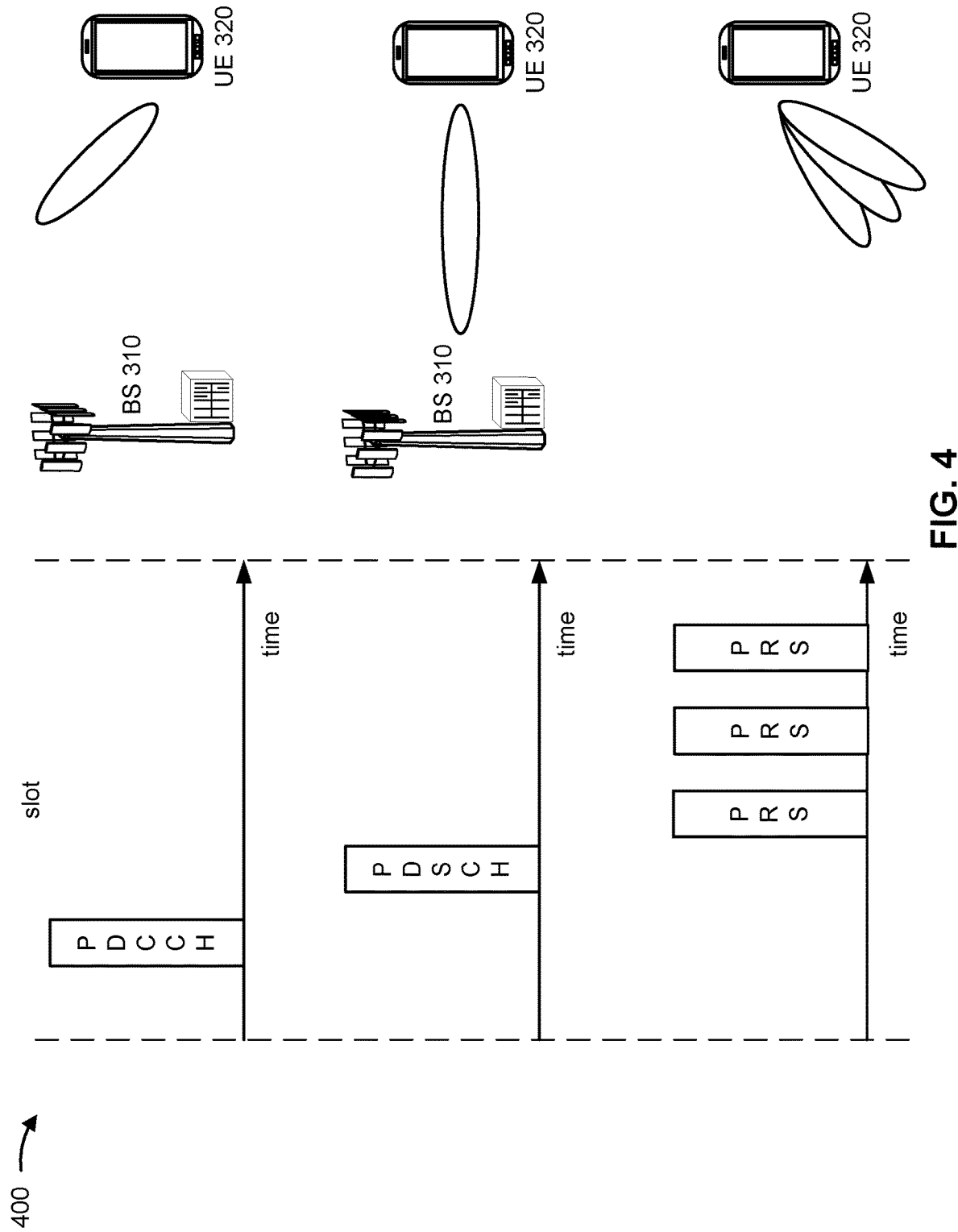
FIG. 4 is a diagram illustrating an example of selecting transmission types for beam switching, in accordance with the present disclosure.

FIG. 4 is a diagram illustrating an example 400 of selecting transmission types for beam switching, in accordance with the present disclosure. FIG. 4 shows beam switching for a time slot, similar to what is described in connection with FIG. 3.

According to various aspects described herein, UE 320 may select one or more transmission types for beam switching in a slot. In some aspects, the transmission types may also be referred to as traffic types. UE 320 may select certain transmission types and ignore other transmission types based at least in part on transmission type priorities. Transmission types may include PDCCH, PDSCH, PUCCH, PUSCH, PRS, CSI-RSs, and/or SRSs. UE 320 may be able to prioritize traffic when a UE capability of UE 320 limits a quantity of beams for beam switching in a slot. A UE capability for beam switching may include a total quantity of beam switches per slot or a quantity of beam switches for a certain communication or operation. For example, as shown in FIG. 4, UE 320 may prioritize PRS measurements such that PRS measurements are obtained, rather than lower priority data. As a result, UE 320 may report PRS measurement results and/or transmit or receive data as appropriate for respective priorities for location management and data transfer. This may help the network to obtain accurate location results and/or to transfer higher priority data. UE 320 may conserve resources that would otherwise be consumed by poor scheduling and retransmissions.

As indicated above, FIG. 4 is provided as an example. Other examples may differ from what is described with respect to FIG. 4.

Figure 5:
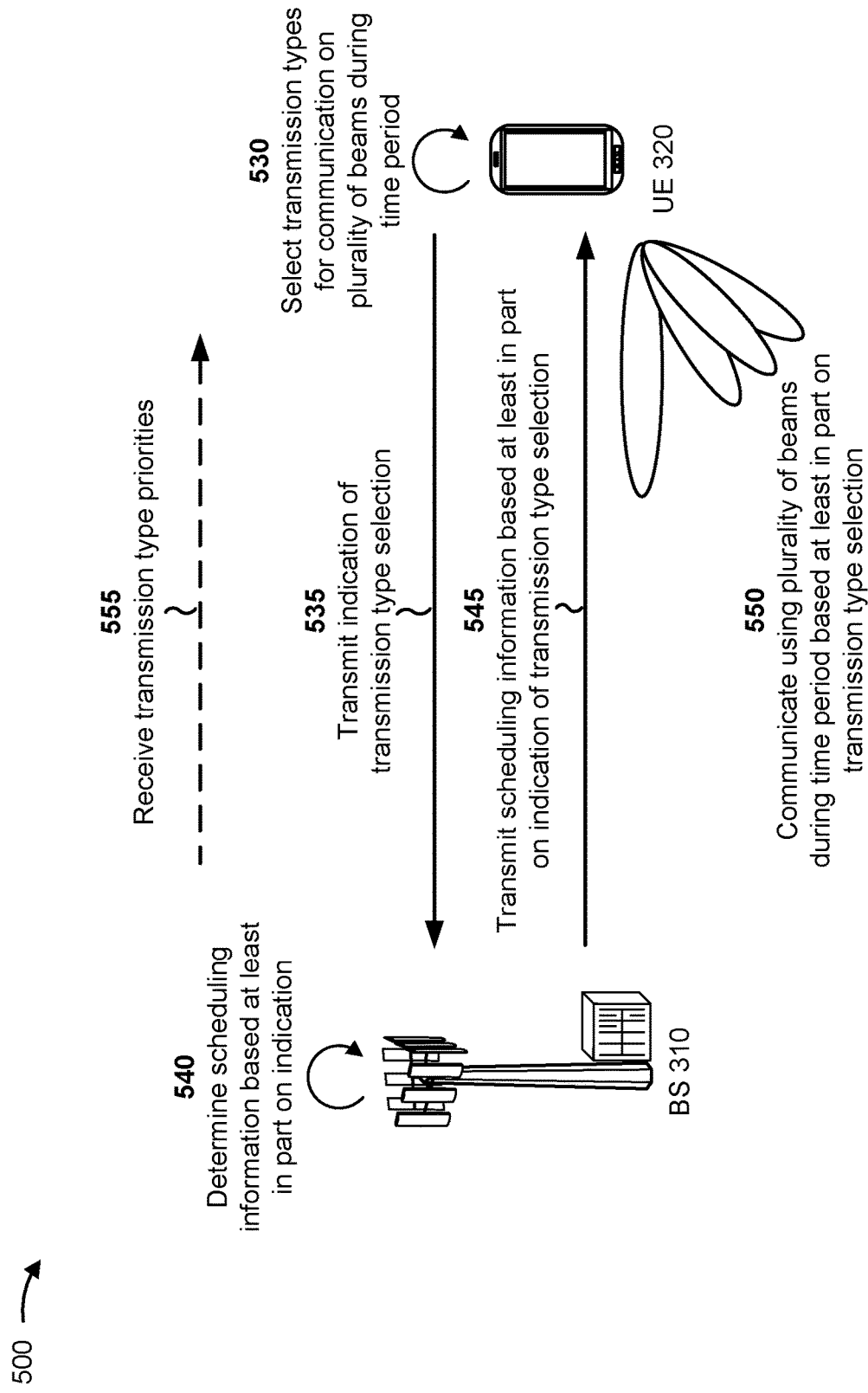
FIG. 5 is a diagram illustrating examples of selecting transmission types for beam switching, in accordance with the present disclosure.

FIG. 5 is a diagram illustrating example 500 of selecting transmission types for beam switching, in accordance with various aspects of the present disclosure. As shown in FIG. 5, example 500 includes communication between base station 310 and UE 320. BS 310 and UE 320 may communicate on a wireless access link, which may include an uplink and a downlink.

UE 320 may perform beam switching based at least in part on transmission type priorities. As shown by reference number 530, UE 320 may select one or more transmission types for communication on a plurality of beams during a time period (e.g., slot, frame, serial frame number). Communication may include transmitting communications and/or receiving communications. UE 320 may select transmission types based at least in part on transmission type priorities in stored configuration information or received from BS 310 in an RRC message, as shown by reference number 555. For example, if location estimates are a high priority, UE 320 may select a PRS operation for a limited set of beams and other data in a next order of priority.

As shown by reference number 535, UE 320 may transmit an indication of transmission type selections for beams of UE 320. In some aspects, the indication is explicit as to what traffic to transmit in a particular beam. In some aspects, the indication may provide a code or indicators for a combination of transmission types, and/or an order of transmission types.

As shown by reference number 540, BS 310 may determine scheduling information for the plurality of beams of UE 320 based at least in part on the indication of transmission type selections by UE 320. For example, BS 310 may cancel a transmission or reception of data, perform an earlier restart for a transmission, and/or schedule transmission types corresponding to the indication. In some aspects, BS 310 may schedule a transmission type on a suboptimal beam, which is a beam that is not an assigned beam for a transmission type or is a same beam for a previous transmission type that does not require a beam switch. As shown by reference number 545, BS 310 may transmit scheduling information to UE 320 that is based at least in part on the transmission type selections by UE 320. As shown by reference number 550, UE 320 may transmit transmission types on the plurality of beams that are prioritized over other transmission types to make better use of limited beam switching resources.

As indicated above, FIG. 5 is provided as an example. Other examples may differ from what is described with respect to FIG. 5.

Figure 6:
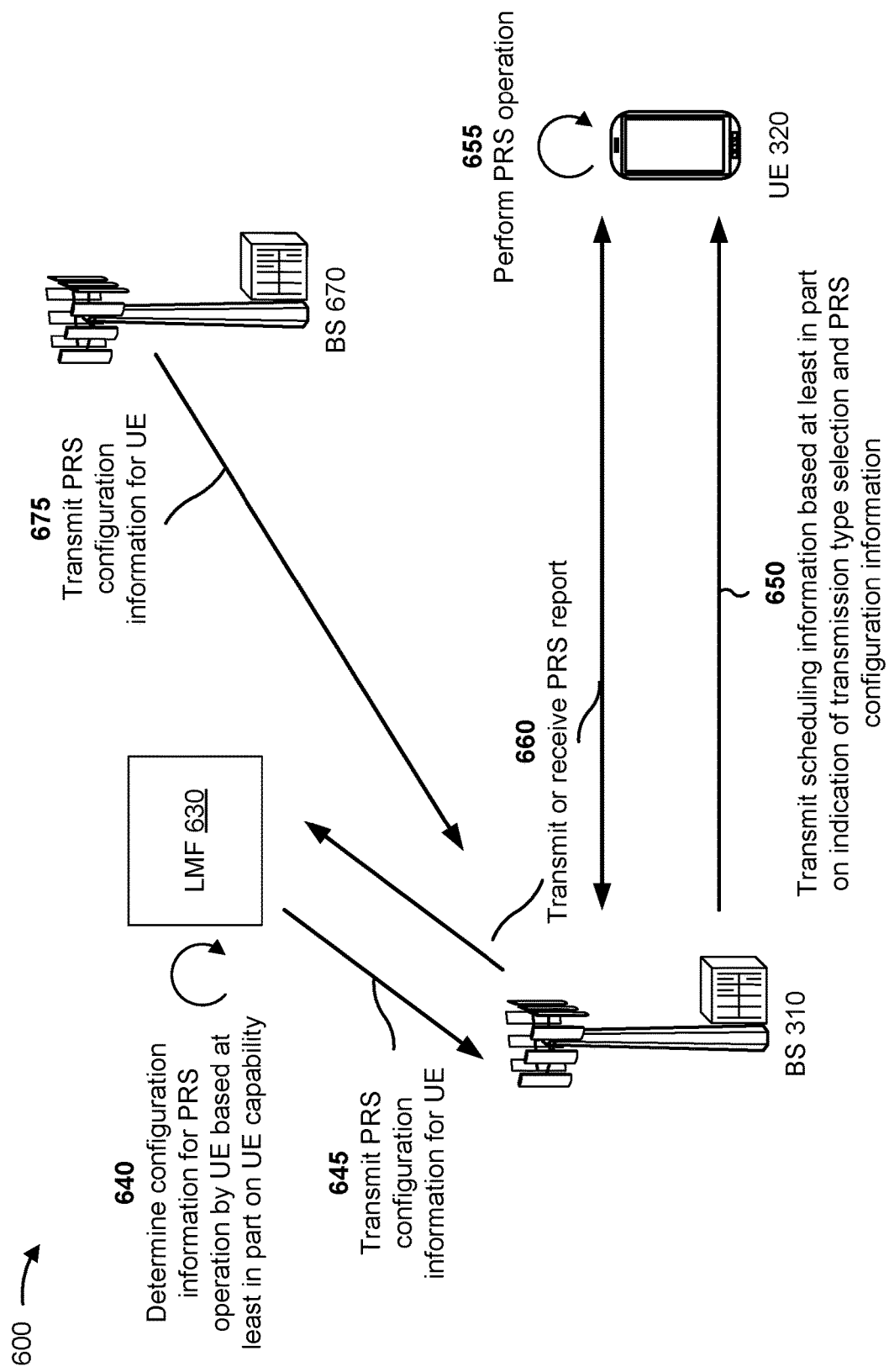
FIG. 6 is a diagram illustrating examples of selecting transmission types for beam switching, in accordance with the present disclosure.

FIG. 6 is a diagram illustrating an example 600 of selecting transmission types for beam switching, in accordance with the present disclosure. As shown in FIG. 6, example 600 includes communication between BS 310 and UE 320. FIG. 6 also shows an LMF 630 that may communicate with BS 310 to provide PRS configuration information for scheduling and to obtain PRS reports from UE 320. In some aspects, another BS 670 (e.g., BS 110 depicted in FIGS. 1 and 2) may be configured for a PRS operation with UE 320. BS 670 may transmit PRS configuration information for UE 320 to BS 310, as shown by reference number 675.

There has been imperfect coordination between UEs, BSs, and LMFs when it comes to configuring, scheduling, and processing PRS measurements. For better coordination, in some aspects, UE 320 may share beam availability information with LMF 630, and LMF 630 may share PRS configuration information with BS 310. BS 310 may schedule traffic on beams of UE 320 based at least in part on transmission type selections from UE 320 and PRS configuration information from LMF 630.

As shown by reference number 640, LMF 630 may determine a PRS configuration for UE 320. This may include how many PRS measurements or PRS beams may be necessary for a certain PRS operation or report. LMF 630 may determine the PRS configuration based at least in part on UE capability information or other information about beam availability for UE 320.

As shown by reference number 645, LMF 630 may provide PRS configuration information to BS 310, which may use the PRS configuration information for scheduling communications on beams for UE 320. If a quasi-colocation (QCL) configuration changes, LMF 630 may update BS 310 with any requirement changes via an NR positioning protocol. BS 310 may forward the PRS configuration information or provide some of the PRS configuration information to UE 320, which may use the PRS configuration information for transmission type selection for beam switching.

Traffic is scheduled by BS 310, which provides a serving cell for UE 320. Accordingly, beam switching requirements may not be known to LMF 630. Moreover, because traffic is dynamic, beam switching may be unpredictable. PRS measurements or transmissions may also have a lower priority than other traffic. In some aspects, to address these issues, UE 320 may share information about beam switching availability with LMF 630 via an LTE positioning protocol (LPP). UE 320 may select PRS operation for beam switching (for semi-static traffic), adjust a QCL relation for PRS, and/or adjust a weight for positioning estimation for measurements.

BS 310 may schedule traffic and transmit scheduling information for beams of UE 320, as shown by reference number 650. BS 310 may schedule the traffic based at least in part on transmission type selections by UE 320 and/or PRS configuration information from LMF 630.

As shown by reference number 655, UE 320 may perform a PRS operation (e.g., obtain PRS measurements, transmit an uplink PRS) using one or more beam switches in a slot. UE 320 may prioritize PRSs during transmission type selection for beam switching based at least in part on scheduling information from BS 310 and/or transmission priority rules. If UE 320 is to conduct a PRS operation, the PRS operation may use certain beams as part of the beam switching, UE 320 may generate a PRS report based at least in part on the PRS operations (e.g., measurements and/or transmission) and transmit the PRS report to BS 310, which forwards the PRS report to LMF 630, as shown by reference number 660. LMF 630 may use the PRS report to determine a location of UE 320, perform position-related procedures, and/or adjust a PRS configuration for UE. If UE 320 prioritizes PRSs as appropriate, according to transmission type priority rules, LMF 630 may have accurate location information, and LMF 630 and/or BS 310 may more efficiently schedule transmissions for UE 320. This efficiency will save time, power, processing resources, and signaling resources of LMF 630, BS 310, and UE 320. In some aspects, UE 320 may receive a PRS report.

In some aspects, UE 320 may be limited as to beams that are available for a PRS operation. Consequently, in some aspects, UE 320 may perform a PRS operation with a suboptimal beam, or a beam that is not assigned for the PRS operation. In so doing, results of the PRS operation may not be as accurate. UE 320 may indicate to LMF 630, in the PRS report or in other information in a field, that a particular measurement is from a suboptimal beam, such that LMF 630 is not alarmed, or does not take action as if the beam is not appropriate for the PRS operation. The information may also indicate whether a suboptimal beam was wide, narrow, and/or the like. UE 320 may also indicate PRS measurements using a suboptimal or unassigned beam via an error or warning message in an LPP report. In some aspects, PRS measurements in suboptimal beams may be weighted less. LMF 630 may then consider the PRS measurements in context or adjust any confidence levels of the PRS measurements.

As indicated above, FIG. 6 is provided as an example. Other examples may differ from what is described with respect to FIG. 6.

Figure 7:
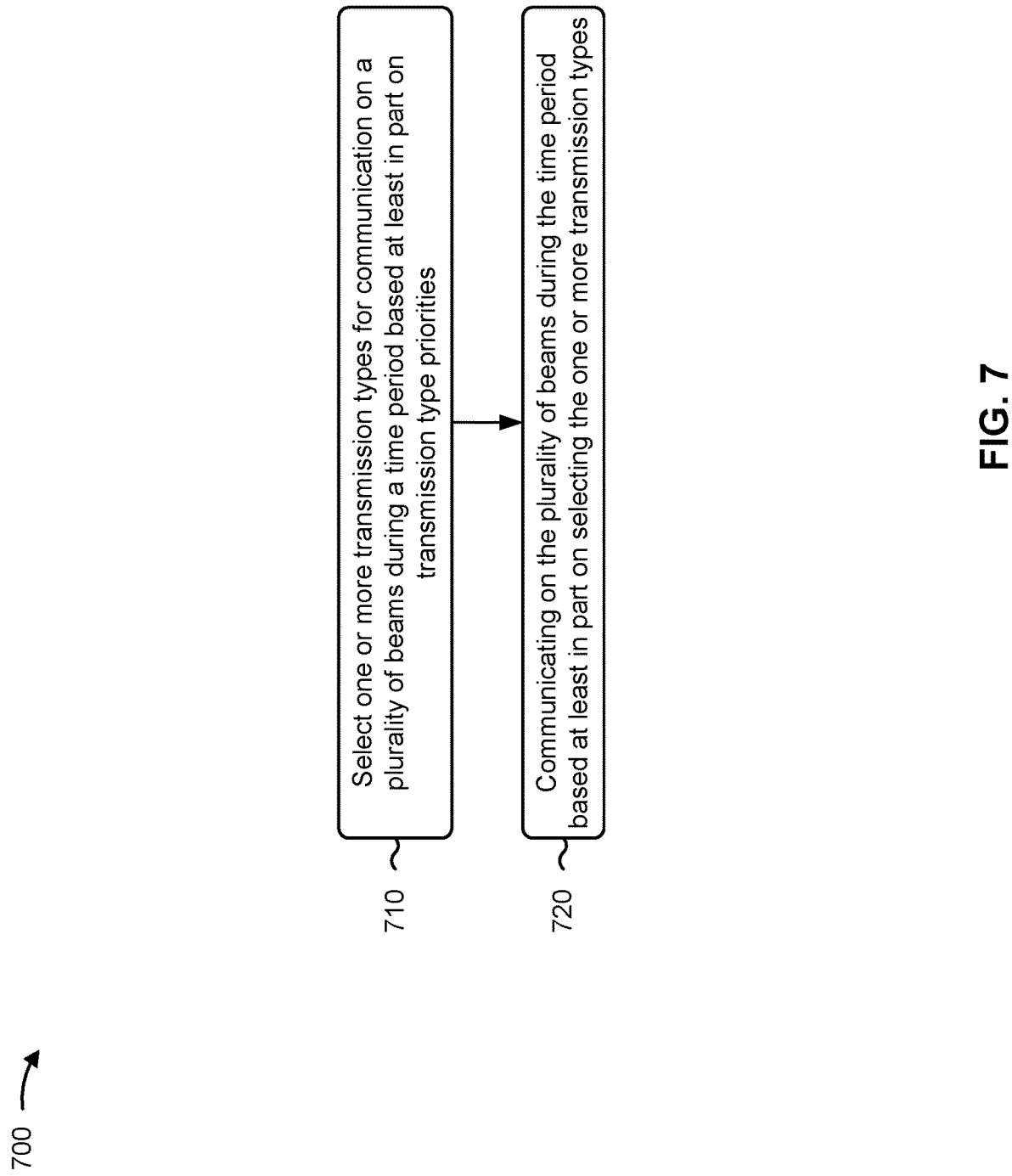
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120 depicted in FIGS. 1-2, UE 320 depicted in FIGS. 3-6) performs operations associated with selecting transmission types for beam switching.

As shown in FIG. 7, in some aspects, process 700 may include selecting one or more transmission types for communication on a plurality of beams during a time period based at least in part on transmission type priorities (block 710). For example, the UE (for example, using antenna 252, demodulator 254, MIMO detector 256, receive processor 258, controller/processor 280, memory 282, or another component) may select one or more transmission types for communication on a plurality of beams during a time period based at least in part on transmission type priorities, as described above.

As further shown in FIG. 7, in some aspects, process 700 may include communicating (transmitting and/or receiving) on the plurality of beams during the time period based at least in part on selecting the one or more transmission types for transmission (block 720). For example, the UE (for example, using antenna 252, demodulator 254, MIMO detector 256, receive processor 258, controller/processor 280, memory 282, or another component) may communicate on the plurality of beams during the time period based at least in part on selecting the one or more transmission types for transmission or reception, as described above.

Process 700 may include additional aspects, such as any single aspect or any combination of aspects described below and/or in connection with one or more other processes described elsewhere herein.

In a first aspect, process 700 includes determining the transmission type priorities from stored configuration information.

In a second aspect, alone or in combination with the first aspect, process 700 includes receiving the transmission type priorities in an RRC message.

In a third aspect, alone or in combination with one or more of the first and second aspects, the time period is a slot, a subframe, or a frame.

In a fourth aspect, alone or in combination with one or more of the first through third aspects, at least one of the transmission types includes a PRS.

In a fifth aspect, alone or in combination with one or more of the first through fourth aspects, process 700 includes transmitting information in a PRS report indicating that a PRS measurement or transmission is not for an assigned beam for PRS.

In a sixth aspect, alone or in combination with one or more of the first through fifth aspects, selecting the one or more transmission types for transmission includes excluding at least one transmission type based at least in part on the transmission type priorities.

In a seventh aspect, alone or in combination with one or more of the first through sixth aspects, process 700 includes transmitting, to a base station, an indication of the one or more transmission types selected for transmission in one of uplink control information (UCI) or a MAC CE.

In an eighth aspect, alone or in combination with one or more of the first through seventh aspects, communicating on the plurality of beams includes communicating on the plurality of beams based at least in part on scheduling information received from a base station.

In a ninth aspect, alone or in combination with one or more of the first through eighth aspects, process 700 includes transmitting information about a UE capability for beam switching to one or more of a base station or an LMF. Process 700 may include transmitting information about a UE capability for beam switching to both a base station and an LMF if PRS is involved.

In a ninth aspect, alone or in combination with one or more of the first through eighth aspects, selecting the one or more transmission types includes selecting the one or more transmission types further based at least in part on a UE capability of the UE for switching beams. That is, the UE may select one or more transmission types for communication on a plurality of beams during a time period based at least in part on transmission type priorities and based at least in part on a UE capability for switching beams (e.g., constraint of a number of beams that may be switched during a time period).

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
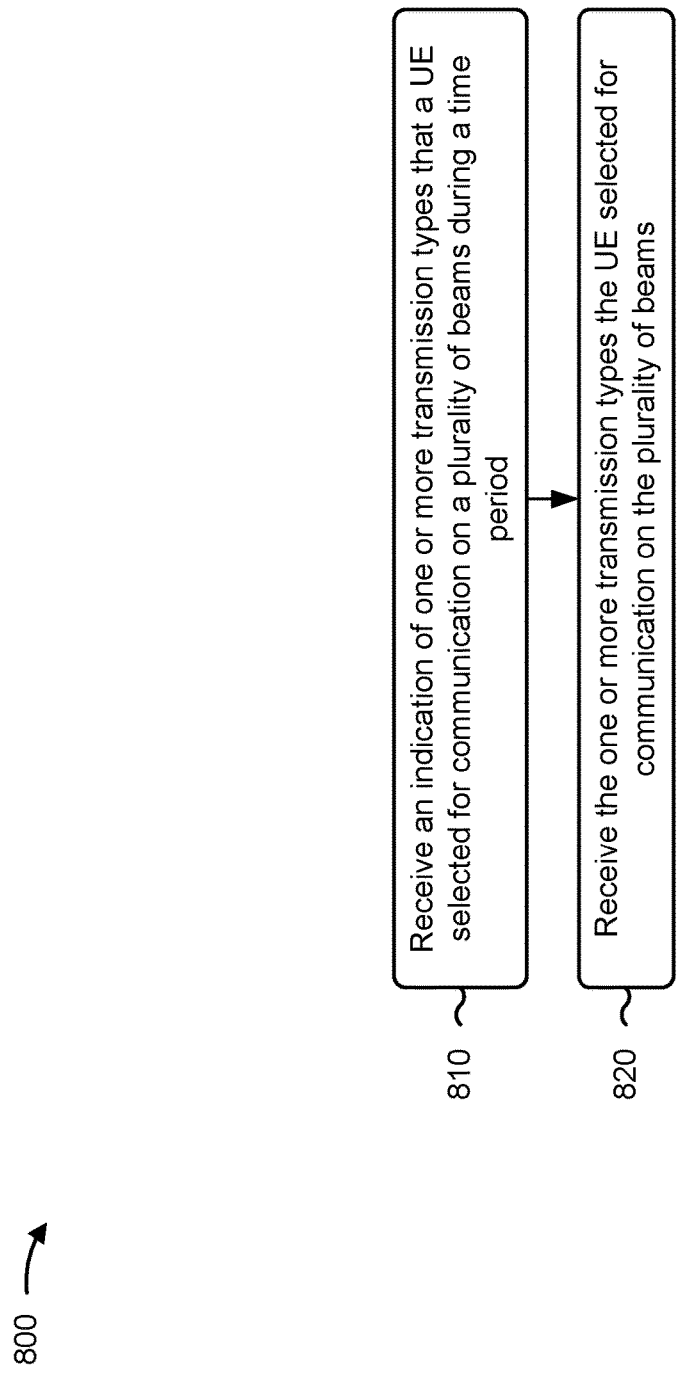
FIG. 8 is a diagram illustrating an example process performed, for example, by a base station, in accordance with the present disclosure.

FIG. 8 is a diagram illustrating an example process 800 performed, for example, by a base station, in accordance with the present disclosure. Example process 800 is an example where the base station (e.g., base station 110 depicted in FIGS. 1-2, BS 310 depicted in FIGS. 3-6) performs operations associated with selecting transmission types for beam switching.

As shown in FIG. 8, in some aspects, process 800 may include receiving an indication of one or more transmission types that a UE selected for communication on a plurality of beams during a time period (block 810). For example, the base station (for example, using transmit processor 220, TX MIMO processor 230, modulator 232, antenna 234, demodulator 232, MIMO detector 236, receive processor 238, controller/processor 240, memory 242, scheduler 246, or another component) may receive an indication of one or more transmission types that a UE selected for communication on a plurality of beams during a time period, as described above.

As further shown in FIG. 8, in some aspects, process 800 may include receiving the transmission types the UE selected for transmission on the plurality of beams (block 820). For example, the base station (for example, using transmit processor 220, TX MIMO processor 230, modulator 232, antenna 234, demodulator 232, MIMO detector 236, receive processor 238, controller/processor 240, memory 242, scheduler 246, or another component) may receive the transmission types the UE selected for communication on the plurality of beams, as described above.

Process 800 may include additional aspects, such as any single aspect or any combination of aspects described below and/or in connection with one or more other processes described elsewhere herein.

In a first aspect, process 800 includes determining transmission type priorities that specify transmission types the UE is to prioritize when selecting transmission types for communication on the plurality of beams and transmitting the transmission type priorities to the UE.

In a second aspect, alone or in combination with the first aspect, transmitting the transmission type priorities includes transmitting the transmission type priorities in an RRC message.

In a third aspect, alone or in combination with one or more of the first and second aspects, the time period is a slot, a subframe, or a frame.

In a fourth aspect, alone or in combination with one or more of the first through third aspects, the indication of one or more transmission types that the UE selected for transmission/reception includes an indication of a PRS.

In a fifth aspect, alone or in combination with one or more of the first through fourth aspects, process 800 includes transmitting information about a UE capability for beam switching to an LMF.

In a sixth aspect, alone or in combination with one or more of the first through fifth aspects, process 800 includes receiving PRS configuration information from an LMF and transmitting scheduling information to the UE for the plurality of beams based at least in part on the PRS configuration information.

In a seventh aspect, alone or in combination with one or more of the first through sixth aspects, process 800 includes transmitting scheduling information to the UE for the plurality of beams based at least in part on receiving the indication of one or more transmission types that the UE selected for communication.

In an eighth aspect, alone or in combination with one or more of the first through seventh aspects, the scheduling information cancels a particular communication on the plurality of beams.

In a ninth aspect, alone or in combination with one or more of the first through eighth aspects, the scheduling information schedules a suboptimal beam of the plurality of beams for a particular communication.

In a tenth aspect, alone or in combination with one or more of the first through ninth aspects, the scheduling information restarts a particular communication on the plurality of beams.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
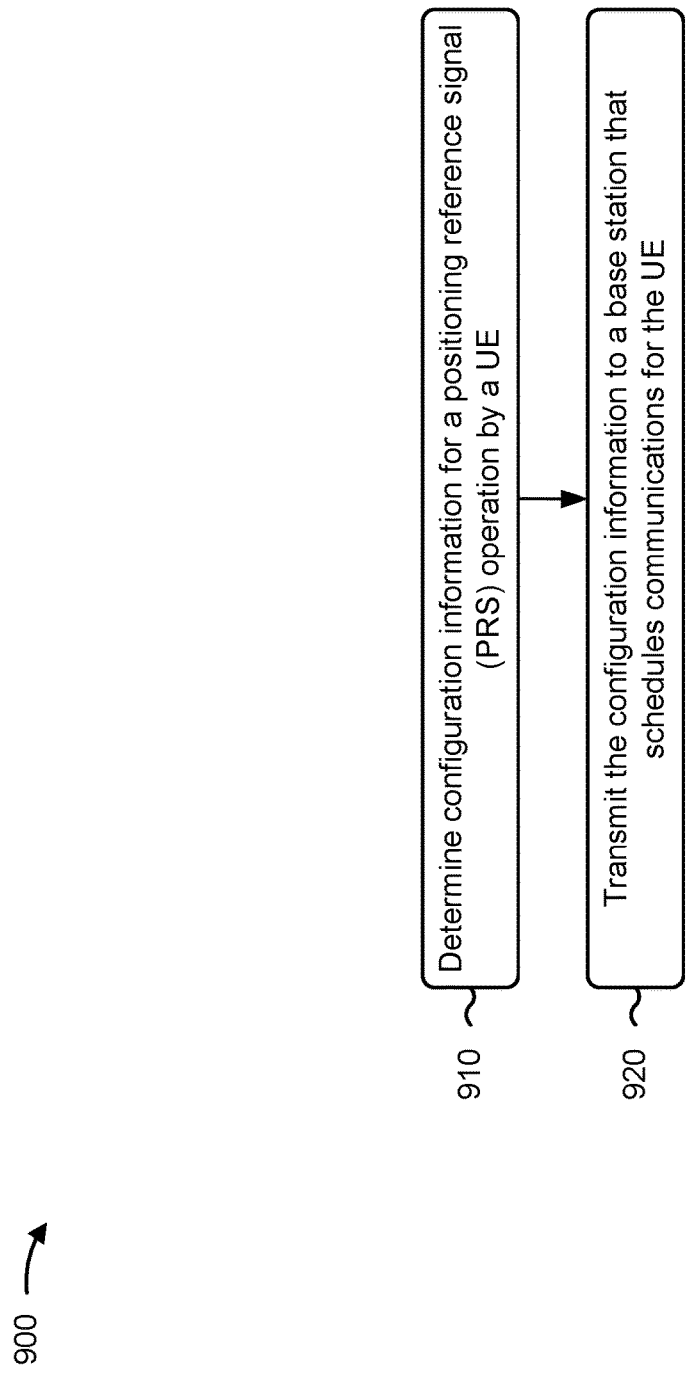
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 130 depicted in FIGS. 1-2, LMF 630 depicted in FIG. 6) performs operations associated with selecting transmission types for beam switching.

As shown in FIG. 9, in some aspects, process 900 may include determining configuration information for a PRS operation by a UE (block 910). For example, the network node (e.g., using communication unit 294, controller/processor 290, memory 292) may determine configuration information for a PRS operation by a UE, as described above.

As further shown in FIG. 9, in some aspects, process 900 may include transmitting the configuration information to a base station that schedules communications for the UE (block 920). For example, the network node (e.g., using communication unit 294, controller/processor 290, memory 292) may transmit the configuration information to a base station that schedules communications for the UE, as described above.

Process 900 may include additional aspects, such as any single aspect or any combination of aspects described below and/or in connection with one or more other processes described elsewhere herein.

In a first aspect, process 900 includes receiving information about a UE capability for beam switching and determining the configuration information includes determining the configuration information based at least in part on receiving information about the UE capability for beam switching.

In a second aspect, alone or in combination with the first aspect, the configuration information indicates which beams a UE is to use for the PRS operation.

In a third aspect, alone or in combination with one or more of the first and second aspects, process 900 includes assigning a weight to a PRS measurement received from the UE based at least in part on the configuration information.

In a fourth aspect, alone or in combination with one or more of the first through third aspects, process 900 includes receiving information in a positioning measurement report (e.g., PRS report) indicating that a PRS measurement and/or PRS transmission is not for a beam assigned for the PRS operation, and adjusting a confidence level of the PRS measurement and/or PRS transmission based at least in part on the information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

- Aspect 1: A method of wireless communication performed by a user equipment (UE), comprising: selecting one or more transmission types for communication on a plurality of beams during a time period based at least in part on transmission type priorities; and communicating on the plurality of beams during the time period based at least in part on selecting the one or more transmission types for communication.
- Aspect 2: The method of Aspect 1, further comprising determining the transmission type priorities from stored configuration information.
- Aspect 3: The method of Aspect 1 or 2, further comprising receiving the transmission type priorities in a radio resource control message.
- Aspect 4: The method of any of Aspects 1-3, wherein the time period is a slot, a subframe, or a frame.
- Aspect 5: The method of any of Aspects 1-4, wherein at least one of the transmission types includes a positioning reference signal (PRS).
- Aspect 6: The method of Aspect 5, further comprising transmitting information in a PRS report indicating that a PRS measurement or transmission is not for an assigned beam for PRS.
- Aspect 7: The method of any of Aspects 1-6, wherein selecting the one or more transmission types includes excluding at least one transmission type based at least in part on the transmission type priorities.
- Aspect 8: The method of any of Aspects 1-7, further comprising transmitting, to a base station, an indication of the one or more transmission types selected for communication in one of uplink control information or a medium access control element.
- Aspect 9: The method of any of Aspects 1-8, wherein communicating on the plurality of beams includes communicating on the plurality of beams based at least in part on scheduling information received from a base station.
- Aspect 10: The method of any of Aspects 1-9, further comprising transmitting information about a UE capability for beam switching to one or more of a base station or a location management function.
- Aspect 11: The method of any of Aspects 1-10, selecting the one or more transmission types includes selecting the one or more transmission types further based at least in part on a UE capability of the UE for switching beams.
- Aspect 12: A method of wireless communication performed by a base station, comprising: receiving an indication of one or more transmission types that a user equipment (UE) selected for communication on a plurality of beams during a time period; and receiving the one or more transmission types the UE selected for communication on the plurality of beams.
- Aspect 13: The method of Aspect 12, further comprising: determining transmission type priorities that specify transmission types the UE is to prioritize when selecting transmission types for communication on the plurality of beams; and transmitting the transmission type priorities to the UE.
- Aspect 14: The method of Aspect 12 or 13, wherein transmitting the transmission type priorities includes transmitting the transmission type priorities in a radio resource control message.
- Aspect 15: The method of any of Aspects 12-14, wherein the time period is a slot, a subframe, or a frame.
- Aspect 16: The method of any of Aspects 12-15, wherein the indication of one or more transmission types that the UE selected for communication includes an indication of a positioning reference signal (PRS).
- Aspect 17: The method of Aspect 16, further comprising transmitting information about a UE capability for beam switching to a location management function.
- Aspect 18: The method of Aspect 16 or 17, further comprising: receiving PRS configuration information from a location management function; and transmitting scheduling information to the UE for the plurality of beams based at least in part on the PRS configuration information.
- Aspect 19: The method of any of Aspects 12-18, further comprising transmitting scheduling information to the UE for the plurality of beams based at least in part on receiving the indication of one or more transmission types that the UE selected for communication.
- Aspect 20: The method of Aspect 19, wherein the scheduling information cancels a particular communication on the plurality of beams.
- Aspect 21: The method of Aspect 19, wherein the scheduling information schedules a suboptimal beam of the plurality of beams for a particular communication.
- Aspect 22: The method of Aspect 19, wherein the scheduling information restarts a particular communication on the plurality of beams.
- Aspect 23: A method of wireless communication performed by a network node, comprising: determining configuration information for a positioning reference signal (PRS) operation by a user equipment (UE); and transmitting the configuration information to a base station that schedules communications for the UE.
- Aspect 24: The method of Aspect 23, further comprising receiving information about a UE capability for beam switching, and wherein determining the configuration information includes determining the configuration information based at least in part on receiving information about the UE capability for beam switching.
- Aspect 25: The method of Aspect 23 or 24, wherein the configuration information indicates which beams a UE is to use for the PRS operation.

Aspect 26: The method of any of Aspects 23-25, further comprising assigning a weight to a PRS measurement received from the UE based at least in part on the configuration information.

Aspect 27: The method of any of Aspects 23-26, further comprising: receiving information in a positioning measurement report indicating that one or more of a PRS measurement or a PRS transmission is not for a beam assigned for the PRS operation; and adjusting a confidence level of the one or more of the PRS measurement or the PRS transmission based at least in part on the information.

Aspect 28: An apparatus for wireless communication at a device, comprising a processor; memory coupled with the processor; and instructions stored in the memory and executable by the processor to cause the apparatus to perform the method of one or more of Aspects 1-27.

Aspect 29: A device for wireless communication, comprising a memory and one or more processors coupled to the memory, the one or more processors configured to perform the method of one or more of Aspects 1-27.

Aspect 30: An apparatus for wireless communication, comprising at least one means for performing the method of one or more of Aspects 1-27.

Aspect 31: A non-transitory computer-readable medium storing code for wireless communication, the code comprising instructions executable by a processor to perform the method of one or more of Aspects 1-27.

Aspect 32: A non-transitory computer-readable medium storing a set of instructions for wireless communication, the set of instructions comprising one or more instructions that, when executed by one or more processors of a device, cause the device to perform the method of one or more of Aspects 1-27.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        select one or more transmission types for communication on a plurality of beams during a time period based at least in part on transmission type priorities and a UE capability of the UE for switching beams, wherein the one or more transmission types include a positioning reference signal (PRS); and
        communicate on the plurality of beams during the time period based at least in part on selecting the one or more transmission types for communication.

2. The UE of claim 1, wherein the one or more processors are configured to determine the transmission type priorities from stored configuration information.

3. The UE of claim 1, wherein the one or more processors are configured to receive the transmission type priorities in a radio resource control message.

4. The UE of claim 1, wherein the time period is a slot, a subframe, or a frame.

5. The UE of claim 1, wherein the one or more processors are configured to transmit information in a measurement report indicating that a PRS measurement or transmission is not for an assigned beam for PRS.

6. The UE of claim 1, wherein the one or more processors, to select the one or more transmission types, are configured to exclude at least one transmission type based at least in part on the transmission type priorities.

7. The UE of claim 1, wherein the one or more processors are configured to transmit, to a network node, an indication of the one or more transmission types selected for communication in one of uplink control information or a medium access control element.

8. The UE of claim 1, wherein the one or more processors, to communicate on the plurality of beams, are configured to communicate on the plurality of beams based at least in part on scheduling information received from a network node.

9. The UE of claim 1, wherein the one or more processors are configured to transmit information about a UE capability for beam switching to one or more of a network node or a location management function.

10. A network node for wireless communication, comprising:
a memory; and
one or more processors, coupled to the memory, configured to:
receive an indication of one or more transmission types that a user equipment (UE) selected for communication on a plurality of beams during a time period, wherein the one or more transmission types are selected based at least in part on a UE capability of the UE for switching beams, and wherein the one or more transmission types include a positioning reference signal (PRS); and
receive the one or more transmission types the UE selected for communication on the plurality of beams.

11. The network node of claim 10, wherein the one or more processors are configured to:
determine transmission type priorities that specify transmission types the UE is to prioritize when selecting transmission types for communication on the plurality of beams; and
transmit the transmission type priorities to the UE.

12. The network node of claim 11, wherein the one or more processors, to transmit the transmission type priorities, are configured to transmit the transmission type priorities in a radio resource control message.

13. The network node of claim 10, wherein the time period is a slot, a subframe, or a frame.

14. The network node of claim 10, wherein the indication of one or more transmission types that the UE selected for communication includes an indication of a positioning reference signal (PRS).

15. The network node of claim 14, wherein the one or more processors are configured to transmit information about a UE capability for beam switching to a location management function.

16. The network node of claim 14, wherein the one or more processors are configured to:
receive PRS configuration information from a location management function; and
transmit scheduling information to the UE for the plurality of beams based at least in part on the PRS configuration information.

17. The network node of claim 10, wherein the one or more processors are configured to transmit scheduling information to the UE for the plurality of beams based at least in part on receiving the indication of one or more transmission types that the UE selected for communication.

18. The network node of claim 17, wherein the scheduling information cancels or restarts a particular communication on the plurality of beams.

19. The network node of claim 17, wherein the scheduling information schedules a suboptimal beam of the plurality of beams for a particular communication.

20. A network node for wireless communication, comprising:
a memory; and
one or more processors, coupled to the memory, configured to:
determine configuration information for a positioning reference signal (PRS) operation by a user equipment (UE);
transmit the configuration information to another network node that schedules communications for the UE; and
receive, from the other network node, information corresponding to a measurement report, generated by the UE, indicating that one or more of a PRS measurement or a PRS transmission is not for a beam assigned for the PRS operation.

21. The network node of claim 20, wherein the one or more processors are configured to receive information about a UE capability for beam switching, and wherein the one or more processors, to determine the configuration information, are configured to determine the configuration information based at least in part on receiving information about the UE capability for beam switching.

22. The network node of claim 20, wherein the configuration information indicates which beams a UE is to use for the PRS operation.

23. The network node of claim 20, wherein the one or more processors are configured to assign a weight to a PRS measurement received from the UE based at least in part on the configuration information.

24. The network node of claim 20, wherein the one or more processors are configured to:
adjust a confidence level of the one or more of the PRS measurement or the PRS transmission based at least in part on the information.

25. A method of wireless communication performed by a user equipment (UE), comprising:
selecting one or more transmission types for communication on a plurality of beams during a time period based at least in part on transmission type priorities and a UE capability of the UE for switching beams, wherein the one or more transmission types include a positioning reference signal (PRS); and
communicating on the plurality of beams during the time period based at least in part on selecting the one or more transmission types for communication.

26. The method of claim 25, wherein the method further comprises transmitting information in a measurement report indicating that a PRS measurement or transmission is not for an assigned beam for PRS.

27. The method of claim 25, wherein communicating on the plurality of beams includes communicating on the plurality of beams based at least in part on scheduling information received from a network node.

28. The method of claim 25, further comprising transmitting information about a UE capability for beam switching to one or more of a network node or a location management function.

29. The method of claim 25, further comprising determining the transmission type priorities from stored configuration information.

30. The method of claim 25, further comprising receiving the transmission type priorities in a radio resource control message.

* * * * *